United States Patent
Bushinsky

(10) Patent No.: US 8,839,337 B2
(45) Date of Patent: Sep. 16, 2014

(54) INTERACTIVE BROADCAST SYSTEM AND METHOD

(75) Inventor: Shay Bushinsky, Ganei Tikva (IL)

(73) Assignee: Shay Bushinsky, Ganei Tikva (IL)

( * ) Notice: Subject to any disclaimer, the term of this patent is extended or adjusted under 35 U.S.C. 154(b) by 501 days.

(21) Appl. No.: 12/457,770

(22) Filed: Jun. 19, 2009

(65) Prior Publication Data

US 2010/0077422 A1 Mar. 25, 2010

Related U.S. Application Data

(63) Continuation-in-part of application No. PCT/IL2007/001577, filed on Dec. 19, 2007.

(60) Provisional application No. 61/065,407, filed on Dec. 19, 2006.

(51) Int. Cl.
| | | |
|---|---|---|
| *H04N 7/16* | (2011.01) | |
| *H04N 21/2225* | (2011.01) | |
| *H04N 21/472* | (2011.01) | |
| *H04N 21/4725* | (2011.01) | |
| *H04N 21/858* | (2011.01) | |
| *H04N 21/2668* | (2011.01) | |
| *H04N 21/239* | (2011.01) | |
| *H04N 7/173* | (2011.01) | |

(52) U.S. Cl.
CPC ....... *H04N 7/17318* (2013.01); *H04N 21/2225* (2013.01); *H04N 21/47202* (2013.01); *H04N 21/4725* (2013.01); *H04N 21/8583* (2013.01); *H04N 21/2668* (2013.01); *H04N 21/2393* (2013.01)
USPC ........... 725/136; 725/105; 725/131; 725/138; 725/139; 463/40; 463/42

(58) Field of Classification Search
USPC .......................... 725/105, 131, 136, 138, 139
See application file for complete search history.

(56) References Cited

U.S. PATENT DOCUMENTS

| | | | |
|---|---|---|---|
| 4,592,546 A | | 6/1986 | Fascenda et al. |
| 5,013,038 A | * | 5/1991 | Luxenberg et al. ............. 463/42 |
| 5,034,807 A | * | 7/1991 | Von Kohorn ....................... 725/5 |
| 5,708,845 A | * | 1/1998 | Wistendahl et al. .......... 715/202 |
| 5,905,523 A | * | 5/1999 | Woodfield et al. .............. 725/99 |
| 6,394,895 B1 | * | 5/2002 | Mino ................................ 463/3 |
| 2002/0029381 A1 | * | 3/2002 | Inselberg .......................... 725/9 |
| 2004/0194129 A1 | * | 9/2004 | Carlbom et al. ................ 725/32 |

(Continued)

OTHER PUBLICATIONS

International Search Report for PCT/IL2007/001577, mailed May 21, 2008.

(Continued)

*Primary Examiner* — Robert Hance
(74) *Attorney, Agent, or Firm* — Rutman IP

(57) ABSTRACT

The present invention provides a system and method for providing interactive broadcasting of a video or TV content wherein users viewing the interactive broadcast content received from a broadcasting service by means of transceiver and display means are able to provide feedbacks relating to said video or TV content any time during said interactive broadcast of said content by means of input means coupled to the transceiver means, said broadcasting service comprises processing means capable of: i) continuously identifying and marking in the broadcasted content one or more key features which may change from time to time; and ii) processing users feedbacks received from the transceiver means and provide indications concerning the feedbacks and events related to the marked key features.

16 Claims, 3 Drawing Sheets

(56) References Cited

U.S. PATENT DOCUMENTS

2004/0210923 A1* 10/2004 Hudgeons et al. ............ 725/24
2005/0273830 A1* 12/2005 Silver et al. .................. 725/105
2008/0229352 A1* 9/2008 Pino et al. ..................... 725/22

OTHER PUBLICATIONS

Written Opinion of the International Searching Authority for PCT/IL2007/1577, mailed May 21, 2008.

* cited by examiner

INTERACTIVE BROADCAST SYSTEM AND METHOD

This application is a Continuation-In-Part of International Application No. PCT/IL2007/001577, filed 19 Dec. 2007, which designated the U.S. and claims the benefit of U.S. Provisional Application No. 61/065,407, filed 19 Dec. 2006, the entire contents of which is hereby incorporated by refernce.

FIELD OF THE INVENTION

The present invention relates to a method and system for providing an interactive viewing experience of video or TV program broadcasts, such as live TV sports broadcasts.

BACKGROUND OF THE INVENTION

Though watching TV broadcasts, such live sport games, is considered a passive activity, the viewer experience of watching such TV broadcasts may be changed into an interactive experience by allowing viewers to interrelate to the displayed broadcast. In particular, the pleasure and benefit in watching sport events may be significantly increased by allowing the viewers to interrelate to the displayed broadcast and demonstrate their understanding of the displayed events.

In http://www.halfbakery.com/idea/Offside_20camera an idea of an offside scheme for football wherein every player wears a low power transmitter the relative distance between every player and reference points such as the goal line can be assessed and computed in real time by means of receiver/detection stations around the edge of the field. In the case of a possible offside call, the result, would be delayed to ensure that the crowd and TV commentators have enough time to make some inane remarks and argue the case for leniency/stringency. Then 'OFFSIDE' or 'ONSIDE' will be announced after said the predetermined delayed elapsed. Toshihiko MISU ["Image Extraction Technology Applied to Sports Programs", Broadcast Technology no. 21, Winter 2005] suggested using a computer-based video analyzer for detecting dynamic information in real-time sports images, which may be used to present the offside lines on the pitch in a soccer game.

An information navigation-type advanced broadcasting system, which extracts an object in a program image and displays information related to that object in synchrony with movement is discussed in NHK STRL ANNUAL REPORT 2004 ["Studies for Advanced Digital Broadcasting"]. This report describes a system applicable for presentation of the trajectory of the ball in a baseball relay or the offside line in a football relay, and a data content conversion system capable of providing data services written in the Broadcast Markup Language (BML) that may be employed in digital broadcasting services.

A system for evaluating responses to television broadcast programs is described in US 2003/00399. In this system an instructional signal is modulated onto a signal transmitted concurrently with the television program and it allows remote viewers to respond to a situation presented in the television program by entering a response on a keyboard.

The methods described above have not yet provided satisfactory solutions for allowing interactive viewing experience of displayed broadcasts.

It is therefore an object of the present invention to provide a method and system for an interactive broadcast of TV shows/programs that allows viewers an active experience with the displayed broadcast.

It is another object of the present invention to provide a method and system for conducting a game based on a TV show/program broadcast.

It is another object of the present invention to provide training means related to viewable TV or video shows/programs, such as, but not limited to, sport games, wherein the viewer is required to make real time decisions regarding the viewed show/program, while displaying the event faster or slower then the pace in which it really happened.

Other objects and advantages of the invention will become apparent as the description proceeds.

SUMMARY OF THE INVENTION

The present invention provides an interactive video or TV broadcast technique allowing viewers (users) to provide feedbacks relating to the viewed content at any given time during the broadcast, and to receive indications regarding the relevancy of their feedbacks to the broadcasted content. More particularly, the interactive broadcast of the present invention allows users to place at any given time during the broadcast their guesses/predictions regarding forthcoming events related to the content being viewed at that time, which are compared to the consecutively occurring events in the viewed broadcast, and to receive indications as to whether their guesses/predictions and the consecutively occurring events match.

The term interactive broadcast used herein refers to any type of media broadcast that allows the viewer to react to it.

In one aspect the present invention relates to a system for providing an interactive broadcast of a video or TV content wherein users are able to provide feedbacks relating to the video or TV content any time during said interactive broadcast, said system preferably comprises:

- a broadcasting service for broadcasting the content, and which comprises processing means for: i) continuously identifying and marking in the content one or more key features which may change from time to time; and ii) processing feedbacks received from the users;
- transceiver means for receiving the content comprising marked key features broadcasted by the broadcasting service, and for receiving the feedbacks from the users and transmitting the same to the broadcasting service for processing, where the transceiver means is adapted to display said content by means of display means;
- one or more input devices for enabling the users to provide the feedbacks by selecting marked key features displayed in the display means.

Preferably, the processing means is adapted to compare the feedbacks received for the users to consecutively occurring events related to the key features, and provide said transceiver means with indications as to whether the feedbacks match or did not match the consecutively occurring events related to said key features.

According to one possible embodiment the system comprises: means for displaying the content; an input device for receiving user inputs from a viewer; processing means for executing a computer program capable of marking candidate areas in images displayed by the display means, for processing inputs received from the viewer, and for providing indications responsive to the inputs; an application server for broadcasting the content, which application server comprises means for indicating location(s) of key features within displayed images of the content, wherein the user inputs are predictions relating to the key features and the responsive indications indicate whether the predictions match the key features.

Optionally, the content is a TV show/program, or sport game.

Preferably, the display means is a TV screen, computer display monitor, or an Interactive game console.

The input device is preferably a type pointing device, a remote control, or a gun pointing device attached to a game console.

The processing means is preferably implemented in, or part of, a cable TV set-op box, a game console chip, or personal computer, and the application server is preferably implemented in, or part of, a cable TV Headend unit.

The processing means preferably comprises means for analyzing video frames.

Preferably, the key features are location of items within displayed images of the content.

In one specific preferred embodiment of the invention the content is a sport event, wherein the key features are locations of a playing article(s) and/or player(s) within frames of the broadcasted content.

Optionally, the processing means comprises a delay unit for introducing a delay of one or more frames in the broadcasted content. The delay unit may an adaptive delay unit wherein the number of frames delay may be set according to systems needs.

In another aspect the present invention relates to a method for providing an interactive broadcast of TV or video content to users by means of a broadcasting service, and by means of transceiver means coupled to display means for displaying the broadcasted content and also coupled to input means for receiving feedbacks related to the displayed content from the users, comprising:

continuously identifying and marking in the content one or more key features which may change from time to time;

transmitting from the broadcasting service the content comprising marked key features;

receiving in the transceiver means the content comprising marked key features and displaying the same in the display means;

receiving feedbacks from users via the input means and transmitting the same to the broadcasting service; and comparing the feedbacks received from the users to consecutively occurring events related to said key features and providing the transceiver means indications whether the feedbacks match or did not match the events related to the key features.

According to one possible embodiment the method comprising: providing said viewer a software module associated with said content and operating said software module by means of processing means provided at the viewer end; transmitting frames of said content to said viewer together with information related to at least some of said frames; receiving and displaying said frames in said display means, and receiving and storing said information in said processing means; receiving from said viewer inputs related to said information; comparing said inputs to said information and indicating whether there is a match.

The method may further comprise introducing a delay of one or more frames in the transmitted frames.

In one specific embodiment of the invention the TV or video content is a sport event.

Optionally, the received information comprises questions relating to the received frames, and wherein the user inputs are answers to said questions.

Optionally, the TV or video content is displayed faster or slower than its real pace.

Advantageously, the received information may relate to locations of items within displayed images of the content, wherein said locations may be highlighted in the frames displayed to the viewer.

The term playset used herein generally refers to the invention scheme which comprises of a service provider capable of carrying out video analysis and a user interaction module.

BRIEF DESCRIPTION OF THE DRAWINGS

The present invention is illustrated by way of example in the accompanying drawings, in which similar references consistently indicate similar elements and in which.

DETAILED DESCRIPTION OF PREFERRED EMBODIMENTS

Figure 1:
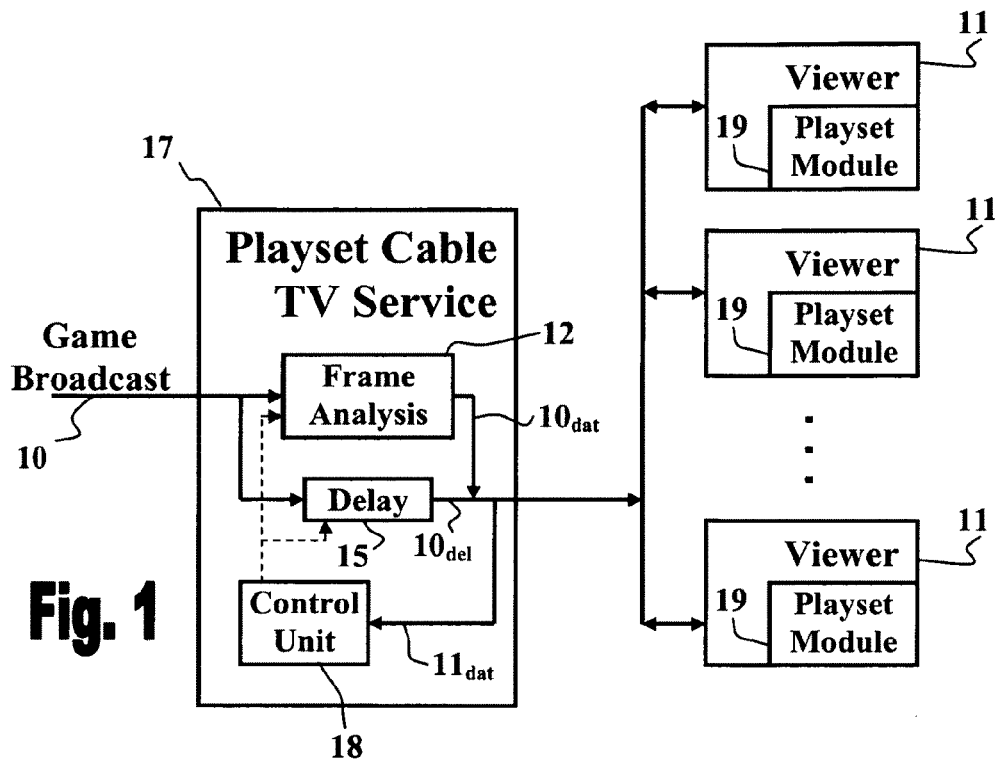
FIG. 1 is a block diagram illustrating an implementation of the invention by means of a cable TV service.

The present invention provides a method and system for providing an interactive broadcast of TV shows/programs, such as, for example, sport events. In general, in case of a TV broadcast of a sport event, in implementations of the invention as the game (soccer, basketball, football . . . ) is being played viewers are asked to predict the next action (move) in the game. Such next action may be, for example, the target of a pass of the ball, will there be a shot on goal, or will a basket be attempted.

The present invention aims to provide means for enabling the creation of such interactive viewing. There are various possible implementations of the invention depending on the hardware used (e.g., cable TV infrastructure, internet, cellular phones, game consoles (Sony PS3, Microsoft Xbox 360, Nintendo Wii, etc.). Some of these implementations rely on "gaming" hardware and may require some coordination while others are meant for simple TV viewing and require no coordination.

In general, a typical system of the invention may comprise the following components:

1. Means for displaying a TV show/program (e.g., sport game), such as a TV screen, computer display monitor, or an Interactive game console;
2. An input device (hardware) that can receive predictions inputs from the user, such as a remote control or a gun pointing device attached to a game console;
3. Processing means for processing the user's inputs, such as a cable TV set-op box or a game console chip. This processing means is loaded with a computer program (also referred to as Playset front-end application or Playset module) that can mark candidate areas on the display means, process user's inputs, report successful predictions to the user and to the service provider (also referred to herein as Playset service).
4. An application server which is the hardware running the Playset service that broadcasts the TV show program, such as, for example, with-in a cable TV Headend unit—cable head-end (or headend—the facility at a local cable TV office that originates and communicates cable TV services and cable modem services to subscribers). In distributing cable television services, the head-end typically includes a satellite dish antenna for receiving incoming programming. This programming is then passed on to the subscriber.

5. The Provider Playset service—a logic that is usually implemented as a software program within the application server to analyze video frames of the TV show/program broadcasted (video image processing logic) prior to its transmission to the subscribers in order to indicate where key features of the game, such as, for example, the ball or the goal are located within the frame. These features may be identified using video analysis algorithms such as ones that recognize objects in proximity to each other and then translate their location to screen coordinates. Subsequently, these locations are then sent to the CATV (cable TV) clients (Playset modules) together with the video frames. The video may be delayed so that a user will be able to predict these coordinates via the Playset module. Other selected features might be player numbers automatically recognized by the video analysis. The selection of interesting targets for user prediction may be implemented automatically via software or semi-automatically by allowing human intervention in the loop.

In one preferred embodiment of the invention, the viewer is watching the game, on-line, with no delay. A pointing device (like a gun in a video game) may be used by the viewer to participate. Whenever the viewer wishes to predict the next action said pointing device is used for indicating the anticipated next move(s). For example, in a displayed football game broadcast, when the viewer wants to point to where the ball will move, said pointing device is used by the viewer to point (indicate) a location/player on/in the displayed image to which the viewer thinks the ball will be passed. The pointed location/player is then highlighted (using software) and if the viewer choice is found to be correct, the system confirms that the viewer made the right choice and may reward him.

In an alternative embodiment of the invention, when no pointing device is available, the game may be transmitted with a slight delay. While the game is being broadcasted, at every point in time, two players of the team holding the ball are marked. For example, one player is marked with blue and the second with red. The viewer has to select, using a remote controller, which one of these two players will receive the ball next. While the ball is passed between players along the game, a pair of players is highlighted after each ball pass.

In yet another alternative embodiment of the invention, alternative areas of the game field to which the ball may be directed at are highlighted, this time without specifying players, such that the viewer may place a guess indicating in which of those areas of the game field the ball will move to next.

In general, in TV sport broadcasts, the present invention allows the viewers to guess the next moves (e.g., action of the ball owner) of a watched game, and place said guesses in the system of the invention. Said guesses do not aim to indicate what the player should do, but what the viewer anticipates the player will actually do. At the end of the game the system of the invention may provide the viewer with statistics on how many times the guesses placed by said viewer were the correct choice (i.e., predicted correctly the next moves), which of the players the viewer anticipated well, and so forth. With time, the viewer is expected improve in anticipating specific players.

This scheme may serve also as a competition to determine a successful anticipator of moves/actions in a TV sport broadcast. A number of people may attempt to predict concurrently the next moves during the game such that the viewer with the greater number of correct guesses (i.e., predicting the next moves during the game correctly, or the speed of a tennis ball) wins. The same scheme may be similarly used for betting.

Additionally, the invention may be used to train players by viewing the game at a higher speed than normal. After the players are trained in such a way, they will become more proficient when playing in real life. The invention may be further used to learn the behavior of specific players. For example, prior to the next game against a specific opponent, every player of one team will watch three games of the opponent team. The coach will then review the players' anticipation scores (i.e., correct guesses) and may use them to guide the players as to where they are weak, choose tactics, etc.

The invention may be used to carry out competitions between the viewers watching the games. For example, the viewer with the highest score will be given the opportunity to be the commentator for the next game.

If the experience is too intensive, a viewer may limit himself to predicting a small set of players, usually the stars. Alternatively, the system may be programmed to issue a task concerning the future move(s) in the game every minute, or other predetermined time period, and not continuously.

It should be clear that the present invention is not limited to broadcasts of sport events, and that it may be used to learn and predict other TV shows/programs.

Sample Cable TV Playset Implementation:

One preferred embodiment of the invention will be now described with reference to FIG. 1, wherein a (e.g., soccer) game 10 being received at the cable TV provider 17 is analyzed frame by frame. The game is broadcasted by provider 17 to the viewers 11 with at least one frame delay ($10_{del}$), by means of a delay unit 15, which may be implemented utilizing a simple software module. Provider 17 has a video analysis unit 12, which may be also implemented by software (e.g. the "Playset service"), which enables provider 17 to detect object locations such as the ball and the players.

Video analysis unit 12 may be implemented utilizing known pattern recognition algorithms, such as, but not limited to pattern discovery in soccer videos through Hierarchical Hidden Markov Models as well as an unsupervised pattern discovery technique for sports video (references: [1] L. Xie, S-F. Chang, A. Divakaran and H. Sun, "Unsupervised Mining of Statistical Temporal Structures in Video," Video Mining, eds. A. Rosenfeld, D. Doermann and D. DeMenthon, Kluwer Academic Publishers, 2003. [2] L. Xie, S. Chang, A. Divakaran, and H. Sun, "Structure Analysis of Soccer Video with Hidden Markov Models," Proc. ICASSP, IEEE Int'l Conference on Acoustics, Speech and Signal Processing (ICASSP), Orlando, Fla., May 2002.) with the delayed broadcast of the game $10_{del}$ cable TV provider 17 also transmits the data $10_{dat}$ obtained by the frame analysis unit 12.

Delay unit $10_{del}$ may be implemented by software or hardware circuitry, and the number of framed delayed by it is preferably capable of being adaptively changed according to the systems needs.

In order to participate in the movement anticipating scheme of the invention each viewer 11 is provided with a Playset module 19, which may comprise various programs suitable for different types of games (e.g., football, soccer, etc), or alternatively, it may be instantly programmed via the cable TV infrastructures per broadcasted game. Playset module 19 is preferably a software module that gets from the CATV provider Playset service 17 a list of coordinates which are candidate locations for the next player to have the ball or the next candidate locations to which the ball may be passed to. It also gets an indication which is the correct location (the right answer) from the provider Playset service 17. Playset module 11 then highlights those candidate locations on the TV screen of viewer 11, and receives the viewer's guess and compares it with the correct coordinate. If the user answered correctly, it will indicate so to the user, and may also send a corresponding indication to the application server (cable TV service 17). The Playset module may be indifferent to whatever game is played and to the locations the user is prompted to predict. These locations are a product of the video analysis performed within the Playset service running at the CATV provider 17.

Figure 2:
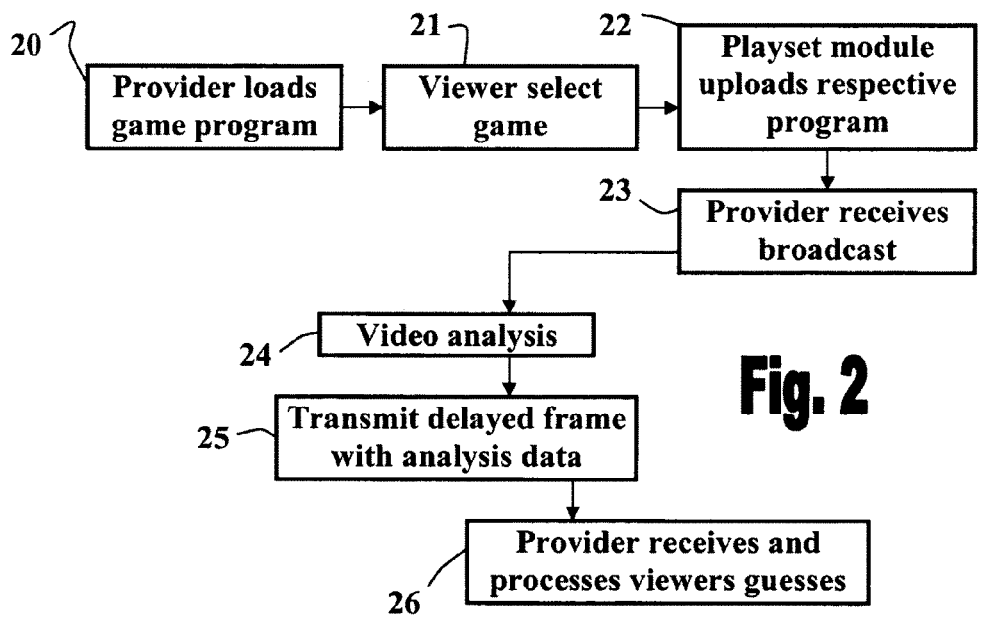
FIG. 2 is a flowchart illustrating a sequence of operations carried out by the provider according to one preferred embodiment of the invention.
Figure 3:
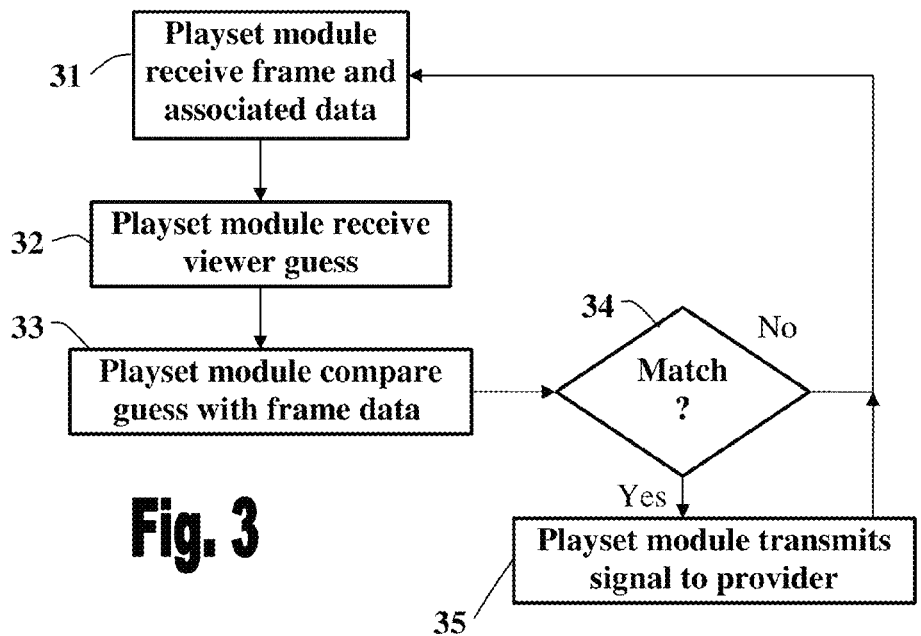
FIG. 3 is a flowchart illustrating a sequence of operations carried out by the Playset module of the viewer according to one preferred embodiment of the invention.

The sequence of operations involved in this procedure will be now described with reference to FIGS. 2 and 3.

Initialization:

1. In step 20 provider 17 uploads the user's set-op box with the Playset module game application. This action is done whenever the user selects a specific TV show/program;
2. Next, in step 21, viewer 11 selects the Playset game application using the Playset module 19 and any suitable interface thereto (e.g., remote control)—this means that the viewer's Playset module 19 is uploaded with Playset game logic which may reside in said Playset module 19, or downloaded from the cable TV service 17.
3. In step 22 provider 17 starts obtaining live video transmission of the game (e.g., soccer) video.

Provider Iteration (Video Server Logic):

1. In step 23 provider 17 uses video analysis unit 12 to detect ball location in current frame (frame n).
2. Next, in step 24, provider 17 uses video analysis unit 12 to detect potential ball receivers in previous frame (frame n−1).
3. The data ($10_{dat}$) produced by the video analysis unit 12 (e.g., Ball location and potential receivers coordinates) is added in step 25 to video frame n−1 ($10_{del}$) (e.g., as text), which is then transmitted to the viewer 11.
4. Signals $11_{dat}$ (e.g., viewer-ids) transmitted from the viewers' Playset modules 19 are received in step 26 by provider 17, where said signals may be an indication of viewers that guessed the location correctly.
6. The signals $11_{dat}$ received in step 26 are processed by control unit 18 provided at cable TV provider 17, which keeps track of the number of correct guesses per viewer-id.

Viewer Iteration (Playset Module Logic):

1. In step 31 (FIG. 3) the Playset module 19 receives video frame and the data associated to it (i.e., player, ball, or area objects to highlight).
2. Next, in step 32, the Playset module 19 obtains via user interface (e.g., remote controller or any other pointing device) the viewer's next ball location guess.
3. Thereafter, in step 33, the Playset module 19 compares viewer's guess location with the true location comprised in the video frame attached.
4. If it is determined in step 34 that there is a match, then in step 35 the Playset module 19 sends match signal (i.e., viewer-id) to the control unit 18 located at provider 17 and displays a corresponding indication to the viewer. Steps 31 to 34 may be repeated by passing the control to step 31 after completing step 35, or whenever it is determined in step 34 that there is no match.

Figure 4A:
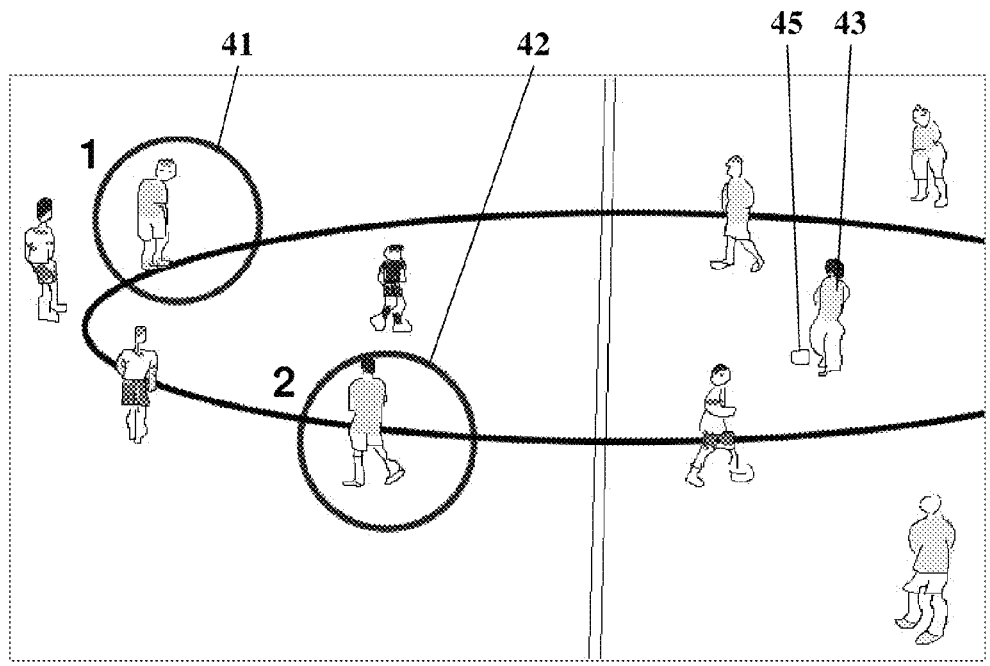
FIGS. 4A and 4B exemplifies an embodiment of the invention wherein candidate areas of ball passing events are marked by the system of the invention.
Figure 4B:
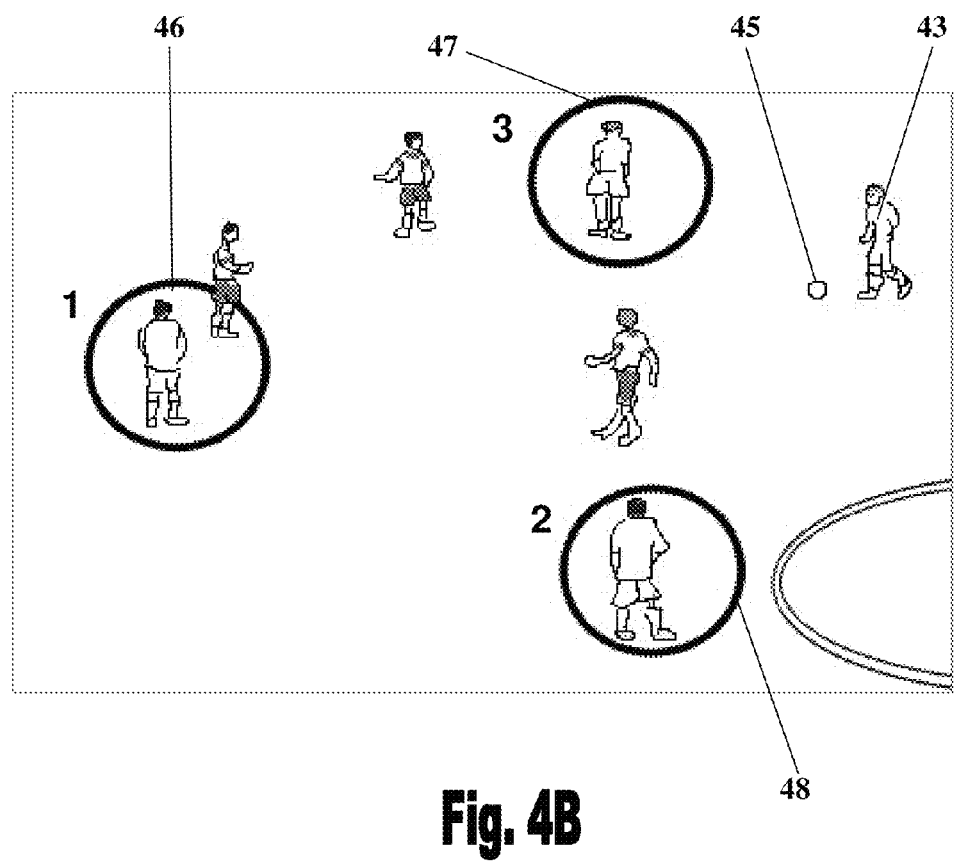

FIGS. 4A and 4B exemplify an embodiment of the invention wherein candidate areas of ball passing events are marked by the system of the invention in a broadcast of a soccer game. In such implementations of the invention the broadcasting service (or application server) used in the system marks the key features—in this example players to which the ball 45 may be passed to, by drawing circles around the areas in the images to be displayed wherein such candidate players are located. As exemplified in FIGS. 4A and 4B, such candidates may be numbered so that users may guess simply by pressing the corresponding number (e.g., on a remote control, or nay other suitable input device) of the marked player to which they predict the ball 45 will be passed to.

In FIG. 4A for example player 43 may kick ball 45 to one of the players 41 or 42 of his team. Potentially receiving players 41 and 42 to which ball 45 may be passed are labeled by numerals "1" and "2" and encircled. Similarly, in FIG. 4B, player 43 may kick ball 45 to one of the players 46, 47 or 48 which are labeled "1", "2" and "3" and encircled.

The users' predictions are then verified by the system as the game proceeds and the system indicates to the users whether their guesses are correct or not. For example, if the ball is indeed passed to a player which the user predicted via the input means used, said user is awarded points, or wins a prize.

Carrying out the Application with a Cellular Phone (No Computer at Home, Just a TV)

In such implementations the game is broadcasted with interactive questions in it (for example red and blue highlighted players). Many other interactive questions can appear as the provider can create. The phone keyboard is used to select user's reply and which is sent to the provider via the cellular telephone network.

An important advantage of the present invention is in the ability to continuously and without interruptions broadcast the viewed content and marking (e.g., by highlighting, placing a circle around the object, and the like) in sequences of broadcasted frames objects (also termed herein as key features) to which the users can relate to by providing feedbacks. Such interactive broadcasting allows posing new challenges to the user, continuously and dynamically, according to the event happening in the broadcasted content in any time. Again, the receipt of feedbacks from the users and their processing to determine their relevancy to the consecutively occurring events is carried out without interrupting the continuous broadcasting and viewing of the broadcasted sport event, or other type of content. In this way users can continuously watch a sport event and interact with the broadcasting system by predicting future events related to the key features which are prompted (marked) by the system.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed is:

1. A system for providing an interactive broadcast of a video or TV content wherein users are able to provide feedbacks relating to said video or TV content any time during said interactive broadcast, comprising:
   a broadcasting service for broadcasting said content, said broadcasting service comprises processing means capable of:
   i) continuously and automatically identifying and marking in said content one or more key features which may change from time to time; and
   ii) processing feedbacks received from said users;

transceiver means for receiving the content comprising marked key features broadcasted by said broadcasting service, and for receiving said feedbacks from said users and transmitting the same to said broadcasting service for processing, wherein said transceiver means is adapted to display said content by means of display means; one or more input devices for enabling said users to provide said feedbacks by selecting in realtime or near realtime a subset of said marked key features displayed in said display means, and receive indications regarding the relevancy of these selections; and further wherein key features of said broadcast relevant for human interaction are continuously and automatically selected without requiring human intervention.

2. The system according to claim 1 wherein the processing means is adapted to compare the feedbacks received from the users to consecutively occurring events related to the key features, and provides said transceiver means with indications whether said feedbacks match or did not match said events related to said key features.

3. The system according to claim 1 wherein the content is a TV show/program, sport game, or sport event.

4. The system according to claim 1 wherein the display means is a TV screen, computer display monitor, or an Interactive game console, and wherein the input device is a pointing device, a remote control, or a gun pointing device attached to a game console.

5. The system according to claim 1 wherein the transceiver means is a cable TV set-top box, a game console chip, or personal computer.

6. The system according to claim 1 wherein the broadcasting service is a cable TV Headend unit.

7. The system according to claim 1 wherein the broadcasting service comprises means for analyzing video frames.

8. The system according to claim 2 wherein the broadcasting service comprises means for analyzing video frames.

9. The system according to claim 3, wherein the key features marked by the processing means are locations of a playing article(s) and/or player(s) within frames of the broadcasted content.

10. The system according to claim 1 wherein the broadcasting service comprises a delay unit for introducing a delay of one or more frames in the broadcasted content.

11. A method for providing an interactive broadcast of TV or video content to a viewer employing a broadcasting service, and transceiver means coupled to display means for displaying said content and coupled to input means for receiving feedbacks related to displayed content from users, comprising:

continuously and automatically identifying and marking in said content one or more key features which may change from time to time;

transmitting from said broadcasting service said content comprising marked key features;

receiving in said transceiver means said content comprising marked key features and displaying the same in said display means;

receiving feedbacks from users concerning a subset of said marked key features via said input means and transmitting the same to said broadcasting service; and comparing said users feedbacks to events related to said key features and providing said transceiver means indications whether said feedbacks match or did not match said events related to said key features, wherein key features of said broadcast relevant for human interaction are continuously and automatically selected without requiring human intervention.

12. The method according to claim 11, further comprising introducing a delay of one or frames in the transmitted content.

13. The method according to claim 11, wherein the broadcasting service further transmits information comprising questions relating to the received frames, and wherein the user inputs comprise answers to said questions.

14. The method according to claim 11, wherein the TV or video content is a sport event.

15. The method according to claim 11, wherein the TV or video content is displayed faster or slower than its real pace.

16. The method according to claim 13, wherein the information relates to locations of items within displayed images of the content.

* * * * *